(No Model.)
J. W. GRANT.
FRUIT CUTTER.
No. 466,343. Patented Jan. 5, 1892.
Fig. 1
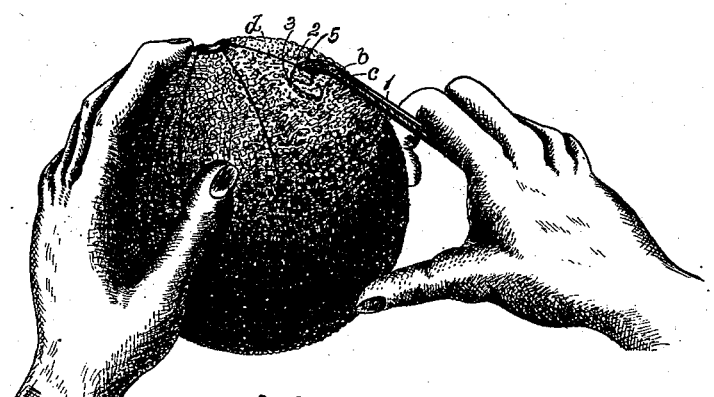
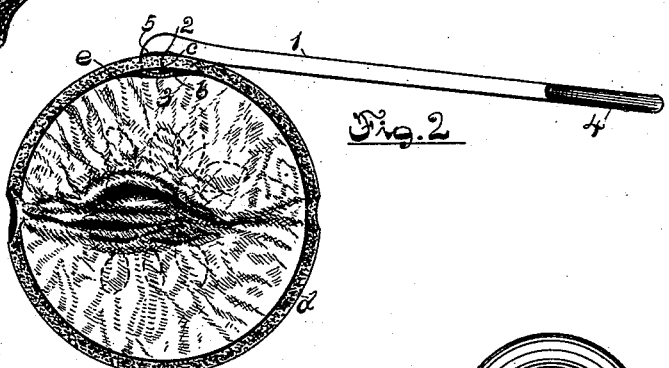
Fig. 2
Fig. 3
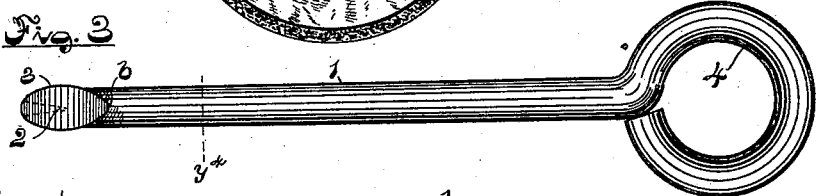
Fig. 4
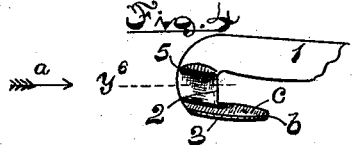
Fig. 5
Fig. 6
Witnesses
James Dundon
A. J. Tanner
Inventor
James W. Grant
By Geo. L. Phillips

UNITED STATES PATENT OFFICE.

JAMES W. GRANT, OF BRIDGEPORT, CONNECTICUT.

FRUIT-CUTTER.

SPECIFICATION forming part of Letters Patent No. 466,343, dated January 5, 1892.

Application filed September 1, 1891. Serial No. 404,418. (No model.)

*To all whom it may concern:*

Be it known that I, JAMES W. GRANT, a citizen of the United States, and a resident of Bridgeport, in the county of Fairfield and State of Connecticut, have invented a certain new and useful Improvement in Fruit-Cutters, of which the following is a specification.

My invention relates to fruit-cutters, and is intended to be used for the purpose of cutting the rind of oranges and fruit of like character.

To this end my invention consists of a body portion or handle carrying a cutter, a shield provided on said cutter to prevent the same entering the body of the fruit while the cutter engages with the rind.

To more fully understand my invention, reference is had to the accompanying drawings, and to the figures and letters of reference marked thereon, which, together with the following specification, explain my device.

Figure 1 represents the manner of using the device on an orange. Fig. 2 is an elevation of one-half of an orange, showing more fully the operation of the cutter-shield. Fig. 3 is an enlarged plan view of the device, looking toward the under side of the shield portion of the cutter; Fig. 4, an enlarged side elevation of the cutting device, a portion of the handle being broken away; Fig. 5, an enlarged end view of the device, looking in the direction of the arrow $a$ of Fig. 4; Fig. 6, an enlarged plan view of the cutter-shield and a sectional view of the cutter through line $y^6$ of Fig. 4.

Its construction and operation are as follows: 1 represents the handle or body portion; 2, the cutter; 3, the shield for the same; 4, ring portion of the handle, with which one of the fingers may engage to control the movements of the cutter.

Removing the rind from an orange with an ordinary knife has been heretofore a matter of considerable trouble. Notwithstanding the utmost care is used the knife will penetrate the inner skin or membrane, causing an instant flow of juice which covers the whole outer surface of the orange, soiling the hands and clothing. As several incisions are necessary before the rind can be removed, the operation becomes very annoying before it is completed.

With my device the knife or cutter is so protected that it cannot possibly damage the inner skin, while any number of incisions can be made in the rind, so that when the same is removed the thin white membrane underlying the rind will be found intact.

In using the device the extreme point $b$ of the shield 3, which is smooth and free from sharp corners or edges, is inserted into the rind, turning the handle 1 at the same time until it lies at a tangent with the orange, as shown in Fig. 2. This operation has brought the rind between the shoulder 5 of the handle 1 and the upper surface $c$ of the shield 3. Hold the device firmly in one hand and turn the orange against the cutter 2 with the other, or both hands can be moved in opposite directions. When the proper incision has been made, a slight outward pull will disengage the cutter.

When the cutter is engaged, as shown in Figs. 1 and 2, the broad upper surface $c$ of the shield 3 will be brought in contact with the under side of the rind $d$, extending laterally on each side of the cut therein. This will keep the cutter up to its work and prevent its slipping out. The smooth rounded under surface of the shield will rest against the inner skin or membrane $e$, but will neither tear nor break the same.

All that is necessary when an uncommonly thick rind is encountered is to force the shoulder 5 far enough into the outer surface, so that the upper part of the shield will come into contact with the inner surface of the rind, while the under part of the shield, as before mentioned, will always protect the underlying membrane.

Having thus described my invention, what I claim as new, and desire to secure by Letters Patent, is—

1. The combination, in a device for cutting fruit-rinds, of a cutter, a support for the same, a shield or guard to protect the fruit underlying the rind from the action of the knife, said cutter placed between the shield and its support and arranged to be operated in the manner shown and for the purpose set forth.

2. The combination, in a device for cutting fruit-rinds, of the handle or support 1, cutter 2, projecting therefrom, shield or guard 3, mounted on the cutter and extending out at right angles thereto, so as to keep the knife in cutting engagement and protect the underlying fruit from the action of the knife, all combined and arranged to operate as described and set forth.

Signed at Bridgeport, in the county of Fairfield and State of Connecticut, this 27th day of August, A. D. 1891.

JAMES W. GRANT.

Witnesses:
SIGMUND DORMITZER,
JOHN ASATLOS.